US012759066B2

(12) United States Patent
Kunze et al.

(10) Patent No.: US 12,759,066 B2
(45) Date of Patent: Oct. 13, 2026

(54) HAND-HELD POWER TOOL

(71) Applicant: Festool GmbH, Wendlingen am Neckar (DE)

(72) Inventors: José Gabriel Kunze, Tübingen (DE); Dominic Ender, Reudern (DE); Charlotte Schleifenbaum, Rechberghausen (DE)

(73) Assignee: Festool G,bH, Wendlingen am Neckar (DE)

( * ) Notice: Subject to any disclaimer, the term of this patent is extended or adjusted under 35 U.S.C. 154(b) by 228 days.

(21) Appl. No.: 18/351,794

(22) Filed: Jul. 13, 2023

(65) Prior Publication Data

US 2024/0033839 A1 Feb. 1, 2024

(30) Foreign Application Priority Data

Jul. 29, 2022 (EP) .................................... 22187853

(51) Int. Cl.
*B23D 59/00* (2006.01)
*B23D 45/16* (2006.01)
(Continued)

(52) U.S. Cl.
CPC ........... *B23D 59/003* (2013.01); *B23D 45/16* (2013.01); *B23D 59/0064* (2024.05); *B27G 19/04* (2013.01); *B27B 9/02* (2013.01)

(58) Field of Classification Search
CPC ........ B27B 9/00; B23D 59/003; B23D 45/16; B27G 19/04
(Continued)

(56) References Cited

U.S. PATENT DOCUMENTS

2006/0265206 A1 11/2006 Onose et al.
2007/0107235 A1* 5/2007 Mok .................... B23D 59/003 30/264

(Continued)

FOREIGN PATENT DOCUMENTS

CN 101028719 A 9/2007
CN 201333565 Y 10/2009

(Continued)

OTHER PUBLICATIONS

European Patent Office Search Report for corresponding patent application No. 22187853.1, dated Dec. 22, 2022, 8 pages (not prior art).

(Continued)

*Primary Examiner* — Nhat Chieu Q Do
(74) *Attorney, Agent, or Firm* — Lucian Wayne Beavers; Patterson Intellectual Property Law, PC

(57) ABSTRACT

A hand-held power tool includes a guide plate including a bearing surface and a top face. A drive assembly includes a drive motor supported above the top face and configured to drive a cutting tool. An illumination arrangement is configured to emit a light cone onto the cutting tool in a direction of travel of the power tool. When the cutting tool is in a locked cutting position in which the drive assembly is locked in position with respect to the guide plate and the cutting tool projects beyond the bearing surface, the cutting tool is disposed in a light path of the light cone to generate a cast shadow of the cutting tool on an end face of the workpiece to be cut, which end face faces the cutting tool and is oriented transversely to the bearing surface of the guide plate.

14 Claims, 7 Drawing Sheets

(51) Int. Cl.
*B27G 19/04* (2006.01)
*B27B 9/02* (2006.01)

(58) Field of Classification Search
USPC .............................................................. 83/13
See application file for complete search history.

(56) References Cited

U.S. PATENT DOCUMENTS

| | | | | |
|---|---|---|---|---|
| 2007/0193039 | A1* | 8/2007 | Onose | B27B 9/00 30/388 |
| 2009/0077817 | A1 | 3/2009 | Gibbons et al. | |
| 2012/0079931 | A1* | 4/2012 | Hansen | B23D 47/02 83/508.2 |
| 2022/0057079 | A1 | 2/2022 | Yu et al. | |

FOREIGN PATENT DOCUMENTS

| | | | |
|---|---|---|---|
| CN | 212652811 | U | 3/2021 |
| EP | 1712318 | A2 | 10/2006 |
| EP | 2039456 | A2 | 3/2009 |
| JP | 2022046093 | A * | 3/2022 |

OTHER PUBLICATIONS

China Office Action for corresponding patent application No. 202310937158.0, dated Jan. 30, 2026, 24 pages (not prior art).

* cited by examiner

HAND-HELD POWER TOOL

RELATED APPLICATIONS

The present application claims priority to European application Ser. No. EP22187853.1 filed Jul. 29, 2022, which is incorporated herein by reference.

BACKGROUND OF THE DISCLOSURE

Field of the Disclosure

The invention relates to a hand-held power tool, in particular a hand-held circular saw or a jig saw, having a guide plate, which has a bearing surface for indirect or direct support on a workpiece to be processed and, opposite from the bearing surface, has a top face wherein a drive assembly having a drive motor is held in the area above the top face, which drive motor can be used to drive a cutting tool, in particular a saw blade, wherein the cutting tool in a locked cutting position, in which the drive assembly is positioned in a stationary manner, in particular locked, with respect to the guide plate, projects beyond the bearing surface on the underside, wherein an illumination arrangement is allocated to the cutting tool, which illumination arrangement emits a light cone onto the cutting tool in the direction of travel of the power tool to generate a cast shadow of the cutting tool on the workpiece.

Description of the Prior Art

JP 2022-46093 A discloses a plunge cut circular saw used to make a plunge cut in the top face of a workpiece to be machined. For this purpose, the guide plate of the plunge cut circular saw is placed on the top face of the workpiece. Then, a drive assembly of the plunge cut circular saw is manually swiveled from a park position to a plunge position with respect to the guide plate. During this swiveling motion, the saw blade of the drive assembly cuts into the top face of the workpiece. In the plunge position, the drive assembly is in its cutting position, wherein the drive assembly rests against a stop on the guide plate. The plunge cut circular saw can then be moved linearly relative to the workpiece to produce a linear cut in the workpiece. An optical cut indicator is provided for the exact orientation of the drive assembly, in particular the saw blade, with respect to the workpiece. For this purpose, the drive assembly has an illumination arrangement located behind the saw blade in the home position in the direction of travel. The illumination arrangement generates a cone of light on each side of the saw blade. These are guided laterally past the saw blade in the direction of the workpiece to be machined. In this way, a cast shadow of the saw blade is projected onto the top face of the workpiece. The cast shadow indicates the location into which the saw blade will plunge when it is swiveled from the park position to the plunge position.

With hand-held power tools, for instance with hand-held circular saws, also known as hand-held circular saws, it is often required to make a miter cut, in a workpiece. For this purpose, a miter angle taken with a bevel can be drawn on the end face of the workpiece. The hand-held circular saw is then placed in front of the end face of the workpiece and the miter position of the hand-held circular saw is set. To this end, a bearing is taken from behind above the saw blade of the hand-held circular saw and the hand-held circular saw is aligned with the mark drawn on the end face. Then the hand-held circular saw is secured in the manually set position to maintain the locked cutting position. Then the cut can be made in the workpiece. This procedure is laborious and the desired angle cannot always be set exactly.

SUMMARY OF THE INVENTION

The invention addresses the problem of facilitating the orientation of a hand-held power tool, in particular for a miter cut, with respect to a workpiece to be able to make an accurate separating cut in the workpiece.

This problem is solved in that the cutting tool in the locked cutting position is disposed in the light path of the light cone to generate a cast shadow of the cutting tool on an end face of a workpiece to be machined, which faces the cutting tool and is oriented transversely to the guide plate.

In the context of the invention, an adjusted cutting position is defined as a position, in which the cutting tool is in a cutting position, wherein the cutting tool projects beyond the bearing surface on the underside or penetrates a plane formed by the bearing surface. The cutting position is set and locked such that the cutting tool is held in a manner that it cannot be swiveled relative to the guide plate.

According to the invention, the power tool can therefore be brought into the desired cutting position. This is easily possible because the generated cast shadow can be precisely aligned with a mark on the end face of the workpiece by adjusting the power tool. In the aligned position, the cutting position can be locked such that the cutting tool is in its desired operating position, in which the separating cut, in particular a miter cut, can also be manufactured accurately immediately afterwards.

The cast shadow thus marks the area on the face of the workpiece that is intersected by a cutting plane formed by the cutting tool. The cutting plane is the plane spanned by the cutting tool and the direction of travel.

According to a preferred embodiment of the invention, provision may be made for the cutting tool in the locked cutting position to be guided through a support plane formed by the bearing surface, wherein the front cutting edge of the saw blade in in the direction of travel intersects the support plane at a cutting site, and for a straight line of sight to be formed between the cutting site and the illumination device in the locked cutting position. In other words, a line of sight is formed along the cutting tool such that a cast shadow caused only by the saw blade and largely having the thickness of the saw blade is created. This ensures that a cast shadow can be generated, which extends onto the workpiece, in particular onto the end face of the workpiece, almost or directly up to the bearing surface. This significantly improves the setting result, in particular for a miter cut.

For the setting process at the area where it passes through the support plane, the cutting tool can be placed in front of the end face of the workpiece, preferably leaning against the latter, in its locked cutting position. Then, in this position, the cast shadow of sharply defined contours can be generated on the end face of the workpiece and the power tool can be easily and precisely aligned with a marking on the workpiece.

The cutting site is the point at which the cutting tool will first enter the workpiece when it is advanced in the direction of travel as intended. In the context of the invention, the term "cutting site" is defined as the area of the cutting tool that produces the actual saw cut. In the context of the invention, the area of the cutting site extends across the cut-generating width of the cutting tool.

For instance, the straight line of sight may directly result as a straight line between a point of the cutting site and an illuminant of the illumination device. Conceivably, the rectilinear connection also occurs between a point of the cutting site and a redirecting means that redirects the light from the illuminant toward the cutting site to create the light cone. The redirecting means can be a mirror, for instance.

In the context of the invention, a light cone may extend along one side of the cutting tool. However, a solution in which light cones extend to both sides of the cutting tool in the locked cutting position is preferred. In this way, a linear cast shadow can be created on the workpiece, which can be easily aligned with a line drawn on the workpiece. For this purpose, provision may also be made in particular for the straight line of sight to extend across the side of the cutting tool extending in the direction of travel, or that one line of sight extends across each of the two sides of the cutting tool extending in the direction of travel.

One possible variant of the invention is such that the guide plate has an aperture through which at least part of the light cone is guided from the top face to the bearing surface of the guide plate. Preferably the light cone can also be guided into the area beneath the bearing surface in such a way that the cast shadow of the cutting tool in the locked cutting position is guided up to the bearing surface or that the distance of the cast shadow from the bearing surface is at most 20% of the maximum cutting depth, preferably at most 10% of the maximum cutting depth, of the power tool. This design of the invention permits creating the cast shadow on the end face of the workpiece in such a way that it is brought up to the bearing surface or close to the latter. This is particularly advantageous when machining workpieces having a small thickness, i.e., having a small extension transverse (perpendicular) to the bearing surface. The maximum cutting depth corresponds to the maximum possible projection of the cutting tool across the bearing surface permitted by the power tool.

In a further development of the invention, provision may also be made for the cutting tool in the locked cutting position to be disposed in the light path of a/the light cone to project a cutting path shadow of the cutting tool extending in the direction of travel onto a top face of the workpiece extending in the direction of travel, also referred to as the workpiece top face. In addition to the marking on the end face, the user is then also shown by means of the cutting path shadow how the cut will extend along the top face of the workpiece. This further improves the accuracy of the machine orientation.

For this purpose, provision may additionally or alternatively be made for a further illumination arrangement to be disposed in the area above the top face of the guide plate, for the further illumination arrangement to be designed and disposed to project a cutting path shadow of the cutting tool onto the top end of a workpiece extending in the direction of travel.

One variant of the invention can be such that the cutting tool is the saw blade of a hand-held circular saw, which is centrally connected to the drive assembly by means of a fastening element, in particular by means of a fastening flange (on one or both sides), and that the light cone(s) of the illumination arrangement in the locked cutting position extend(s) in the path area above the guide plate at least for the most part in an area formed between the top face of the guide plate and the fastening element to cast a cast shadow onto the end face of the workpiece. Then the fastening element is prevented from affecting the generation of the cast shadow on the end face of the workpiece, and preferably allows the saw blade to be linearly marked on the end face of the workpiece as a cast shadow.

In the context of the invention, the locked cutting position is preferably the setting position at which the cutting tool protrudes with its maximum cutting depth beyond the bearing surface of the guide plate.

However, it is also conceivable that the power tool can also be used to set one or more further locked cutting positions in addition to the locked cutting position at maximum cutting depth, in which the cutting tool advances across the bearing surface of the guide plate at a cutting depth, which is smaller than the maximum cutting depth.

Preferably, in at least one of the further locked cutting positions, provision may also be made for the cutting tool to be disposed in the light path of the light cone to generate a cast shadow of the cutting tool on an end face of the workpiece to be machined, which faces the cutting tool and is oriented transversely to the bearing surface of the guide plate.

A power tool according to the invention may be designed such that the drive assembly is swivel connected to the guide plate by means of a miter bearing, that the miter bearing comprises a bearing piece and a swivel piece swivel connected thereto, that the bearing piece is coupled to the guide plate and the swivel piece is coupled to the drive assembly, and that the illumination arrangement is directly or indirectly attached to the swivel piece. This results in a space-saving design and the illumination device can be closely assigned to the cutting tool for the purpose of creating a cast shadow of sharply defined contours.

Preferably, in the context of the invention, the illumination arrangement is kept outside the area of a saw dust collection port and/or behind the upper hood in the direction of travel, which is used for an orderly saw dust extraction.

Preferably, in the context of the invention, the illumination arrangement is disposed behind the upper hood in the direction of travel and/or beneath the drive shaft in at least one locked cutting position.

Particularly preferably, individual light elements of the illumination arrangement are disposed in and/or centered on the cutting plane of the cutting tool, If the power tool is designed as a hand-held circular saw with a saw blade, then it may be the case that the saw blade is assigned a protective cover (for instance a pendulum hood), which can be adjusted between a protective position and a release position, which protective cover, in the protective position, at least partially covers the saw blade in the area of the bearing surface, and that the protective cover has an aperture through which the light of the illumination arrangement is guided at least partially in the protective position to generate the light cone(s) along one or both sides of the saw blade. Based on this design, the cast shadow can also be created when the protective cover is closed. This improves occupational safety.

In the context of the invention, the guide plate may be placed directly on the top face of the workpiece. In a variant, it can also be the case that one or more guide mounts extending in the direction of travel are provided in the area of the bearing surface of the guide plate, that the bearing surface of the guide plate is seated on a support surface of a guide rail, wherein guides of the guide rail interact with the guide mount(s) to form a longitudinal guide, that the guide rail has, opposite form the bearing surface, an underside, which is prepared for being supported by the top face of a workpiece, and in that the light cone(s) is/are guided at least partially past or through the guide rail to generate the cast shadow on the workpiece.

The problem of the invention is also solved using a method for cutting a workpiece by means of a hand-held power tool, wherein the hand-held power tool has a guide plate, which has a bearing surface for indirect or direct support on the workpiece to be processed and has a top face opposite from the bearing surface, wherein a drive assembly having a drive motor is held in the area above the top face, by means of which drive motor the cutting tool can be driven, wherein the cutting tool is brought into a locked cutting position, in which the drive assembly is positioned in a stationary manner, in particular locked, with respect to the guide plate, and the cutting tool projects beyond the bearing surface on the underside, wherein an illumination arrangement is assigned to the cutting tool, which illumination arrangement emits a light cone onto the cutting tool in the direction of travel of the power tool. To facilitate the orientation of a hand-held power tool with respect to the workpiece and to be able to make an exact separating cut in the end face of a workpiece, provision is made in this case for the cutting tool in the locked cutting position to be disposed in the light path of the light cone in such a way that a cast shadow of the cutting tool is generated on an end face of the workpiece to be processed, which end face faces the cutting tool, and that then the cutting tool is used to make a separating cut in the workpiece to be processed.

BRIEF DESCRIPTION OF THE DRAWINGS

The invention is explained in greater detail below based on exemplary embodiments shown in the drawings. In the figures.

DETAILED DESCRIPTION

Figure 1:
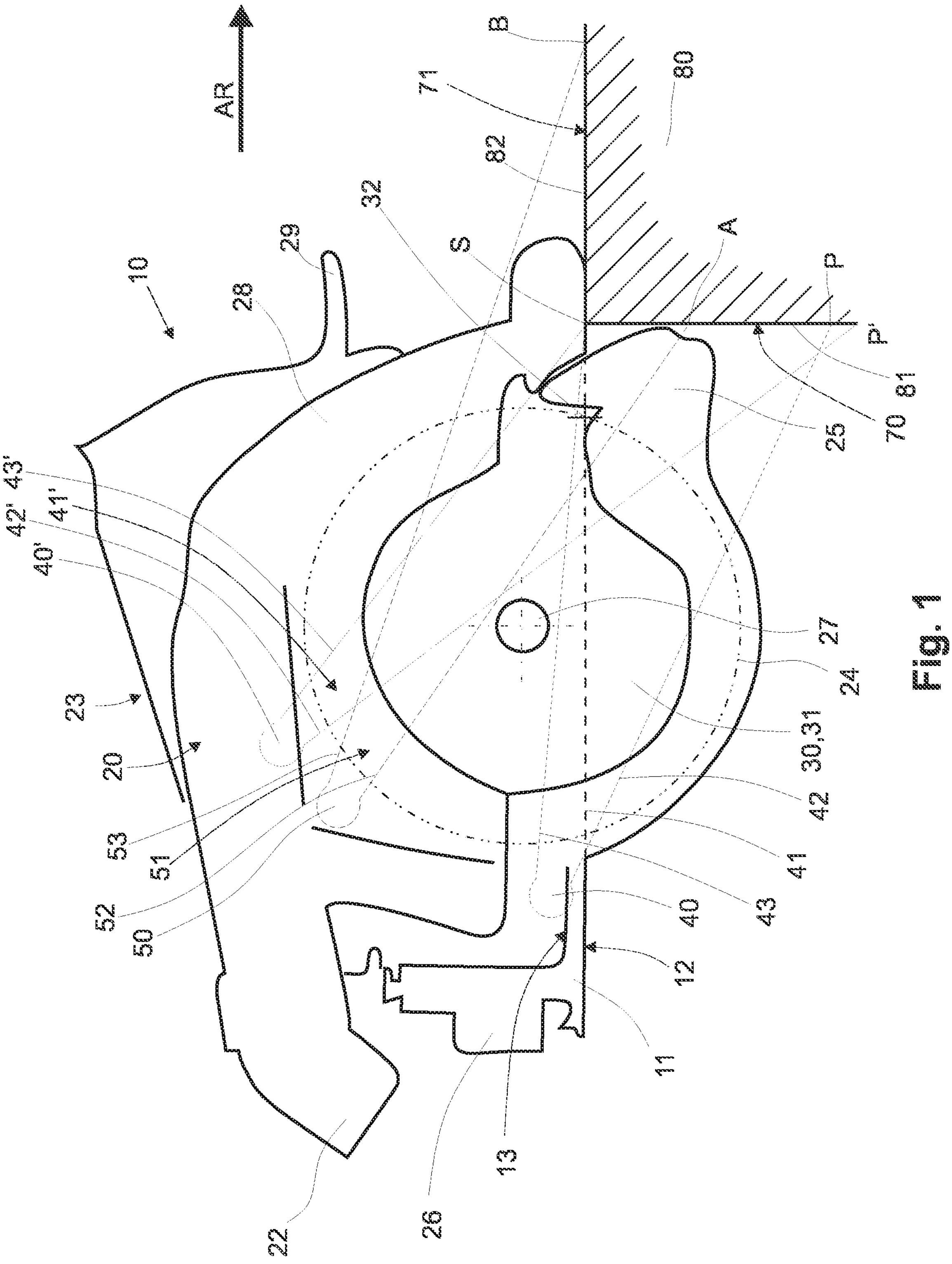
FIG. 1 shows a schematic diagram and a side view of a hand-held power tool in relation to a workpiece.

FIG. 1 shows a side view of a hand-held power tool 10, namely a hand-held circular saw. In a conventional design, the hand-held circular saw has a guide plate 11 that is used to be placed on and guided along a top face 82 of a workpiece 80 to make a cut, in particular a separating cut, in the workpiece 80.

The guide plate 11 forms a bottom bearing surface 12 that can be advanced along the top face 82 of the workpiece 80.

A drive assembly 20 is disposed in the area above a top face 13 of the guide plate 11. The drive assembly 20 has a drive motor 21 that is used to drive a cutting tool 30, which in this exemplary embodiment is a saw blade 31 (circular saw blade).

To mount the cutting tool 30, the drive assembly 20 comprises a drive shaft that forms a contact stub for the cutting tool 30. The inner side of the cutting tool 30 facing the drive assembly 20 rests on this contact stub. A fastening element 27, in particular a clamping flange, is placed on the opposite outer side of the cutting tool 30, which clamping flange is screwed to the drive shaft to clamp the cutting tool 30 between the contact stub and the fastening element 27.

As FIG. 1 further illustrates, the drive assembly 20 comprises an upper hood 28 that at least partially encloses the saw blade 31 in the area above the top face 13 of the guide plate 11 to prevent manual access to the peripheral cutting area of the saw blade 31.

In particular, the upper hood 28 may also form a saw dust collection port. It can be used to guide saw dust generated during the cutting operation using the workpiece 80 to an extraction port 22. A suction device for removal or a collecting container for collecting the saw dust can be attached to the suction port 22 in the usual manner.

The drive assembly also comprises, in a known manner, a handle 23 by which the power tool 10 can be securely held and advanced in the direction of travel AR.

To protect the saw blade 31 from access also in the area beneath the bearing surface 12, a protective cover 24 is provided, which can be designed as a swing hood. This protective cover 24 at least partially covers the lower peripheral area of the saw blade 31, which is not protected by the upper hood 28.

The protective cover 24 has a stop 25 at the front in the direction of travel AR, at which the protective cover 24 can be swiveled in the opposite direction to the direction of travel AR. If the stop 25 of the protective cover 24 hits an end face 81 of a workpiece 80, the protective cover 24 opens automatically and continuously in a known manner when the power tool 10 is advanced in the direction of travel AR. Likewise, the protective cover 24 can be opened manually by means of a lever element 24.2, for instance to provide a better view of the marking drawn on the end face 81 of the workpiece 80.

FIG. 1 illustrates in a schematic manner that the working assembly 20 can be swivel connected to the guide plate 11 directly or indirectly by means of a miter bearing 26. In this case, the swivel axis formed by the miter bearing 26 extends in the direction of travel AR. Accordingly, swiveling the drive assembly 20 about the swivel axis of the miter bearing 26 can adjust the pitch of the saw blade 31 to produce miter cuts.

It is also conceivable that the working assembly 20 is swivel connected to the guide plate 11 about a horizontal plunge axis, which is perpendicular to the direction of travel AR. Then, in addition, the hand-held circular saw can also be used to make a plunge cut and the cutting depth of the saw blade can be adjusted.

For this purpose, the hand-held circular saw has a locking device 29 by means of which the drive assembly 20 can be positioned relative to the guide plate 11 in such a way that the cutting tool 30 can be secured in at least one locked cutting position in which the cutting tool projects at least partially beyond the bearing surface 12 on the underside.

FIG. 1 illustrates that the saw blade 31 can be used to make a cut in the end face 81 of the workpiece 80. For an exact adjustment of a cutting angle transverse to the direction of travel, the invention provides for the use of an illumination arrangement 40. The illumination arrangement 40 may include an illuminant, which may include one or more lighting elements.

LEDs, for instance, are used as lighting elements. It is conceivable that the lighting element or the illuminant is assigned a lens, which can be used to optically influence, in particular focus, the light emitted by the illuminant.

The illumination arrangement 40 is connected to the central power supply of the power tool 10.

Preferably, the illumination arrangement 40 may be activated when the main switch used to activate the drive motor 21 is actuated.

For instance, in a first position, the main switch may initially activate only the illumination arrangement 40. In a further position, the drive motor 21 can then be switched on.

The illumination arrangement 40 may preferably be disposed and positioned behind the axis of rotation of the saw blade 31 in the direction of travel AR, preferably behind the circumferential boundary of the saw blade 31 in the direction of travel AR.

Preferably, the illumination arrangement 40 is mounted on the area of the power tool 10 that is swiveled about the swivel axis of the miter bearing 26 by the drive assembly 20.

The illumination arrangement 40 is disposed such that the light it emits is emitted along one or both sides of the saw blade 31 in the form of a light cone 41 in the direction of travel AR when the saw blade 31 is in its locked cutting position. This is clearly shown in FIG. 1. There, the saw blade 31 is assigned to the guide plate 11 in a fixed adjustable manner such that it can be secured relative to the guide plate 11 both about the swivel axis of the miter bearing 26 and about the plunge bearing axis—not shown. In this locked cutting position, the saw blade 31 is ready to cut into the end face 81 of the workpiece 80.

In the locked cutting position, the saw blade 31 is in the light path of the illumination arrangement 40. Thus, the saw blade generates a cast shadow 70 on the end face 81 of the workpiece 80. In FIG. 1, the cast shadow 70 on the end face 81 of the workpiece 80 extends from a point S to an end point P. Point S is defined by an upper light beam 43 delimiting the light cone 41 upward in the cutting plane. The end point P is delimited by a lower light beam 42 delimiting the light cone 41 downward in the cutting plane.

Advantageously, point S is located on the workpiece edge formed by the end face 81 and the top face 82 of the workpiece 80. Stated differently, point S is located in the intersection of the plane of the bearing surface 12 with a plane perpendicular thereto and tangential to the front edge of the stop 25 when the protective cover 24 is in a closed position or in the protective position.

The end point P is located in the cutting plane beneath or away from point S.

FIG. 1 illustrates the cutting site 32 with which the saw blade 31 first penetrates the end face of the workpiece 80, as intended, when it is advanced in the direction of travel AR. Advantageously, if this cutting site 32 is adjacent to the end face 81, a line of sight should be possible between the lateral boundary of the cutting site to the illumination arrangement along one or both respective assigned sides of the saw blade 31. This allows the cast shadow 70 to reach the bearing surface 12 of the guide plate 11.

Advantageously, it may also be the case that when the stop 25 is in contact with the end face 81 of the workpiece 80, there is a straight line of sight (see light beam 43) between the illumination arrangement 40 and point S. This ensures that, in this positioning of the power tool 10, the cast shadow 70 of the saw blade 31 can be brought up to the bearing surface 12 or at least close to the bearing surface 12, uninfluenced by the fastening means 27 or any contact stub on the rear side of the saw blade 31.

The lower light beam 42 delimiting the light cone 41 can be guided to an end point P on the end face 81 of the workpiece 80. If the workpiece 80 has a low height, it is also conceivable that no end point P is formed on the end face 81 by the lower light beam 42, but still a continuous cast shadow 70 is generated.

FIG. 1 further illustrates that the same effects, or approximately the same effects, as can be achieved with the illumination arrangement 40 can also be achieved with the illumination arrangement 40'. The illumination arrangement 40' is designed in a similar manner to the illumination arrangement 40, i.e., reference can be made to the above.

The illumination arrangement 40' is assigned to the peripheral edge of the saw blade 31 such that the light cone 41' emitted from the illumination arrangement is directed along one or both sides of the saw blade 31 to create a cast shadow of the saw blade 31 on the end face 81 of the workpiece 80.

To this end, the light cone 41' is emitted in the locked cutting position of the saw blade 31 in the direction of travel AR, as FIG. 1 shows. For this purpose, the illumination arrangement 40' is preferably disposed behind the axis of rotation of the saw blade 31.

The lower light beam 42' of the light cone 41' is guided, in particular above, past the fastening element 27 along the saw blade 31 to form the end point P' of the cast shadow 70 on the end face 81 of the workpiece 80. Again, in this case as well, if the workpiece 80 is designed to be thin, there is not necessarily an end point P'. The upper light beam 43' of the light cone 41' can be guided again to the end face 81 in such a way that point S results. The cast shadow 70 then extends in the area between points S and P'.

If the illumination arrangement 40' is again designed for light cones 41' to extend along both sides of the saw blade 31, then a line-shaped cast shadow 70 again results on the end face 81, which is guided up to the bearing surface 12 or close to the bearing surface 12.

FIG. 1 indicates that another illumination arrangement 50 may be provided to be used as a cutting path indicator. The cutting path indicator can be used to generate a projection of a cast shadow (cutting path shadow 71) of the saw blade 31 on the top face 82 of the workpiece 80. As FIG. 1 shows, for this purpose the further illumination arrangement 50 can be present, for instance, in the area behind the axis of rotation of the saw blade 31 and on the end facing away from the guide plate 11 above the axis of rotation on the drive assembly 20.

The further illumination arrangement 50 generates a light cone 51, which is delimited by the two light beams 52, 53 in the drawing plane according to FIG. 1. The cast shadow of the saw blade 31, which is generated by the further illumination arrangement 50, extends between the two end points A and B, wherein end point B is located in an area of the top face 82 of the workpiece 80 in front of the power tool in the direction of travel AR. In particular, as the representation illustrates, a part of the cast shadow may also be used to create a cast shadow between points A and S on the end face 81 of the workpiece 80. End point A is thus located in an area of the end face 81 of the workpiece 80 beneath the bearing surface 12 of the guide plate 11.

Consequently, provision may also be made within the scope of the invention for a single illumination arrangement 50 to be used to generate both a cast shadow on the end face 81 and a cutting path shadow 71 on the top face 82 of the workpiece 80.

All illumination arrangements 40, 40', 50 have in common that the respective lighting elements of the illumination arrangements 40, 40', 50 are disposed in the same plane as the cutting tool 30 or the cutting plane.

Figure 2:
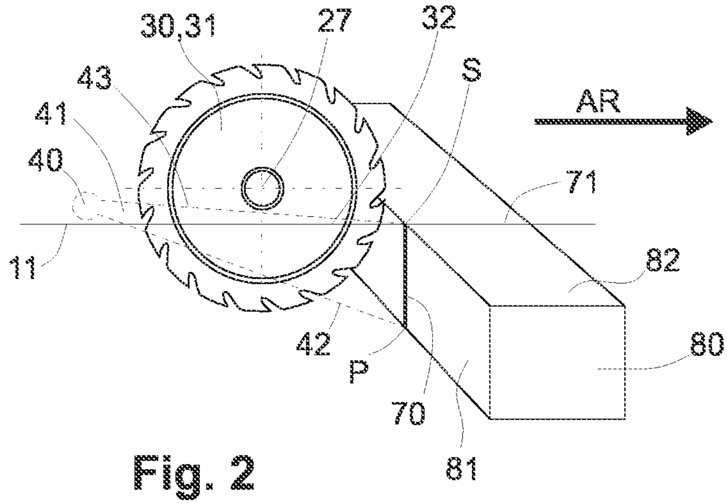
FIGS. 2 to 6 show isolated detailed representations of the hand-held power tool of FIG. 1 in different processing positions.
Figure 3:
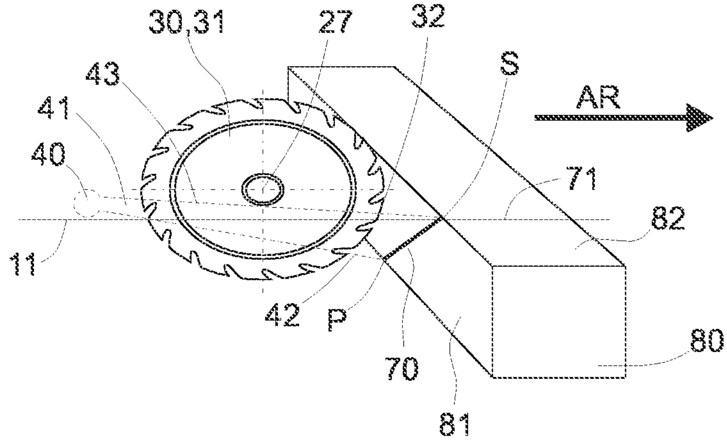
Figure 4:
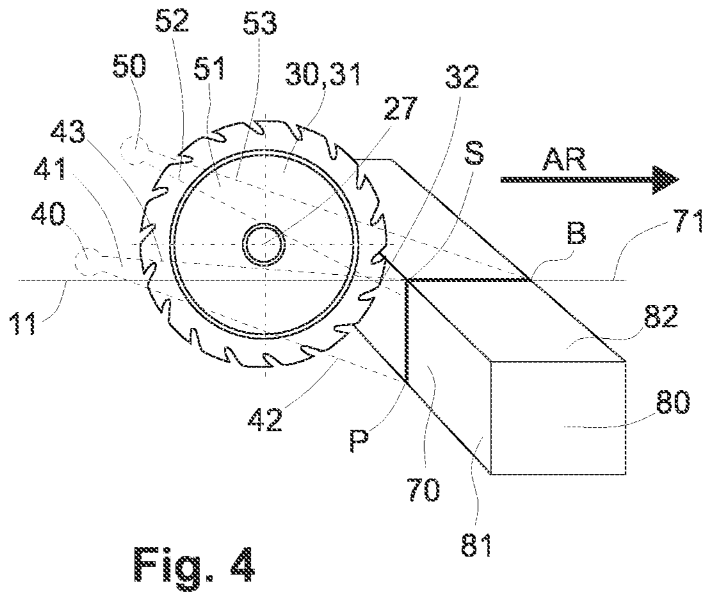

FIGS. 2-4 show various working situations of the power tool 10 according to FIG. 1 by way of example. As FIG. 2 illustrates, the drive assembly 20 is locked in its home positions in a cutting position such that the saw blade 31 is perpendicular to the bearing surface 12. Accordingly, the illumination arrangement 40 can be used to project a line-shaped cast shadow 70, which also extends perpendicular to the bearing surface 12, onto the end face 81 of the workpiece 80.

According to FIG. 3, the drive assembly 20 is locked in a cutting position, in which the saw blade plane of the saw blade 31 extends at an angle deviating from 90° to the bearing surface 12. Thus, the saw blade 31 can be used to make a miter cut in the end face 81 of the workpiece 80. In the cutting position shown in FIG. 3, the illumination device 40 can be used to project a slanting cast shadow 70 of the saw blade 31 onto the end face 81 of the workpiece 80 in accordance with the orientation of the saw blade 31.

FIG. 4 illustrates the orientation of the saw blade 31 as shown in FIG. 2, i.e., perpendicular to the bearing surface 12. As in FIG. 2, the illumination arrangement 40 projects a cast shadow 70 onto the end face 81 of the workpiece 80. In addition, the further illumination arrangement 50 is used here. This further illumination arrangement 50 can be used to achieve a cutting path shadow 71 of the saw blade 31 on the top face 82 of the workpiece 80 for improved alignment of the power tool 10 with respect to the workpiece 80.

Figure 5:
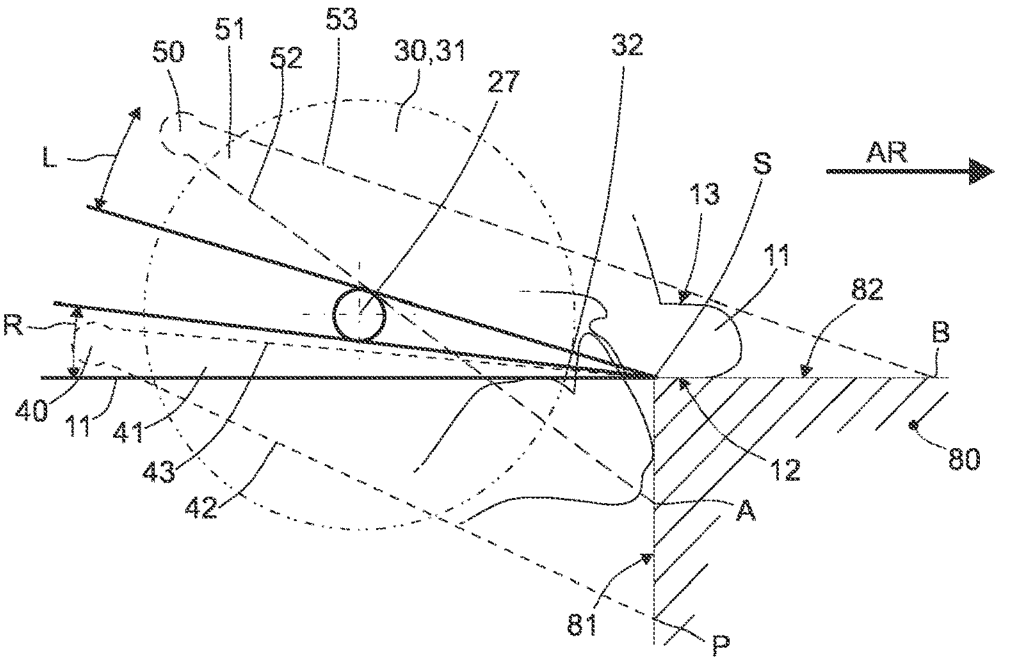
Figure 6:
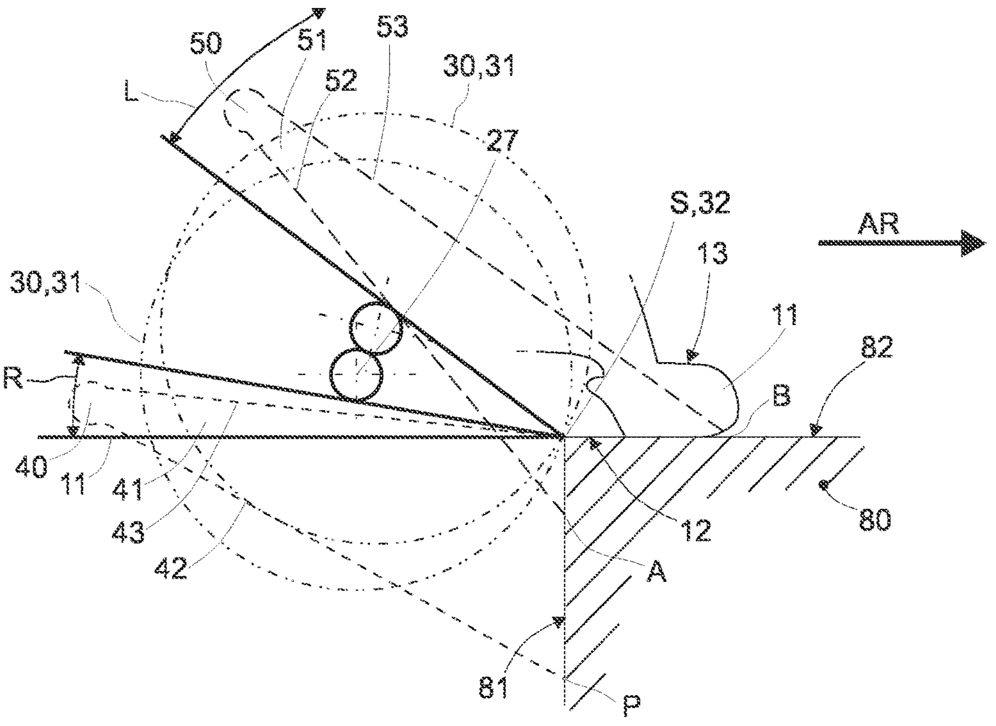

FIGS. 5 and 6 illustrate angular ranges R and L for positioning options of the illumination arrangement 40 and the further illumination arrangement 50 for different locked cutting positions. The illumination arrangement 40 and the further illumination arrangement 50 can be positioned within the angular ranges R and L, to generate the intended linear shadows of the saw blade 31 without the shadow of the fastening element 27 and/or of the rear contact stub, on which the saw blade 31 is supported being imaged on the end face 81 and/or on the top face 82 of the workpiece 80.

FIG. 5 shows the options for positioning the illumination arrangements 40 and 50 for the locked cutting position with maximum cutting depth within the angular ranges R and L when the protective cover 24 is closed.

The preferred angular range R is obtained as the range between a tangential connection line to the underside of the fastening element 27 and/or the underside of the contact stub disposed on the rear, where the saw blade 31 is supported when the saw blade 31 is in the locked cutting position with the maximum cutting depth, and the point S and the bearing surface 12. Thus, the light cone 41 emitted by the illumination arrangement 40, in particular the light beam 42, extends beneath the fastening element 27 and/or beneath the contact stub disposed on the rear end in all locked cutting positions of the power tool 10. The angular range R is preferably relative to or stationary with respect to the guide plate 11.

FIG. 6 illustrates the options of positioning the illumination arrangements 40 and 50 when the protective cover 24 is open, then when the cutting site 32 has been brought up to the workpiece 80 for projection purposes, once for the locked cutting position with maximum cutting depth and once for a locked cutting position with reduced cutting depth.

FIG. 6 illustrates that the angular range R is greater when the guard 24 is open and/or the depth of cut of the saw blade 31 is reduced than when the guard 24 is closed, and thus is not relevant with respect to the positioning of the illumination arrangements 40.

The angular range L is obtained as the range between a tangential connection line to the top face of the fastener 27 and/or to the top face of the rear contact stub on which the saw blade 31 is supported, and the cutting site 32. The angular area L is preferably relative to or stationary with respect to the upper hood 28. Thus, the arrangement of the further illumination arrangement 50 is independent of the cutting position.

Figure 7:
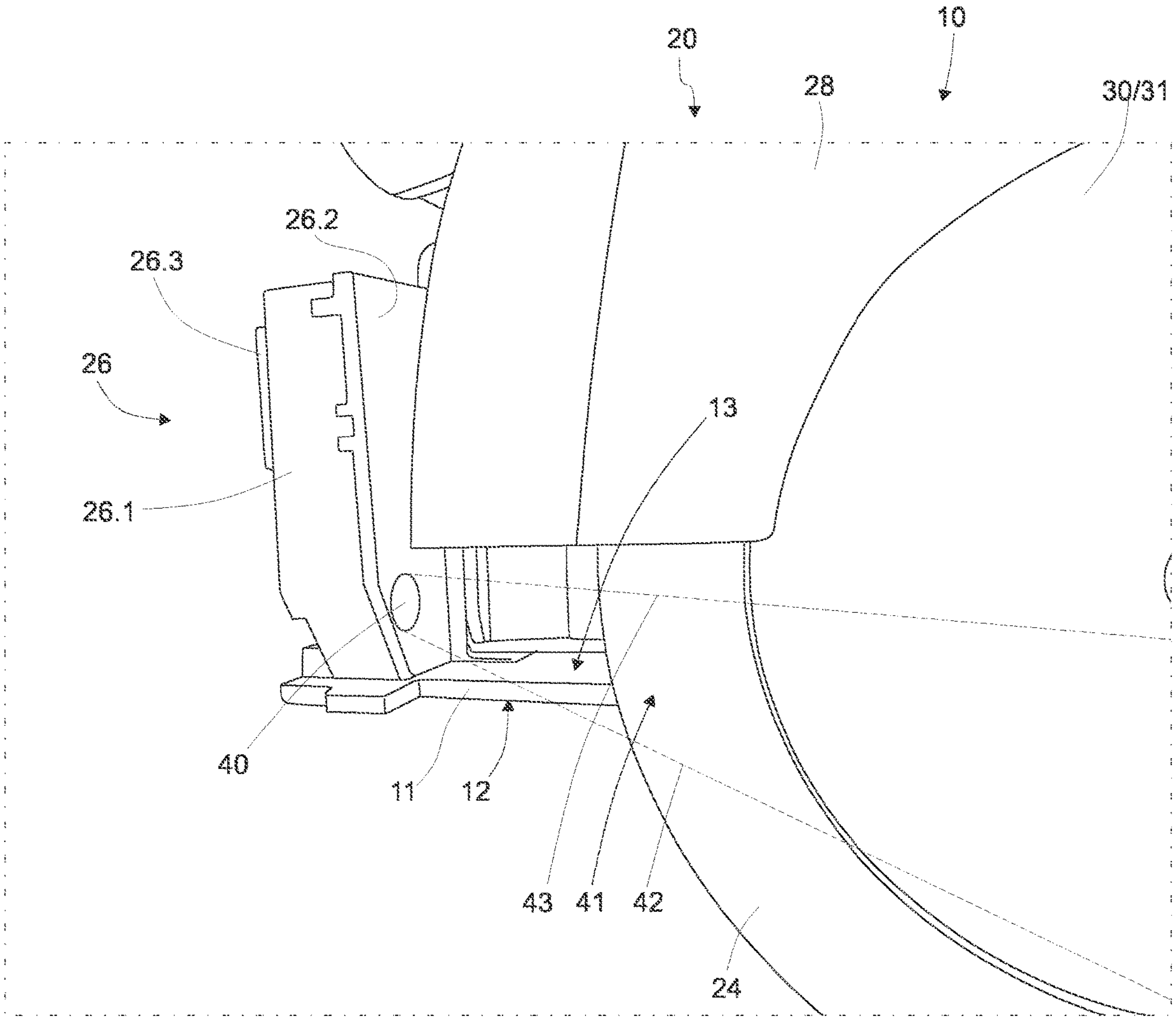
FIG. 7 shows a detailed perspective representation of a power tool according to the invention from diagonally in front.

FIG. 7 shows one possible arrangement of the illumination arrangement 40. As this representation illustrates, the illumination arrangement 40 is disposed on the miter bearing 26, particularly the rear miter bearing. The miter bearing 26 has a bearing piece 26.1, which is connected to the guide plate 11 in a fixed manner. A swivel piece 26.2 is swivel coupled to the bearing piece 26.1, wherein the swivel piece 26.2 can be swiveled about the swivel axis of the miter bearing 26. The drive assembly 20 is attached to the swivel piece 26.2. Accordingly, the drive assembly 20 can be swiveled about the swivel axis of the miter bearing 26.

The illumination arrangement 40 is attached to the swivel piece 26.2, i.e., it swivels when the drive assembly 20 is swiveled. Thus, the illumination arrangement 40 follows the swiveling motion of the saw blade 31.

FIG. 7 illustrates that the illumination arrangement 40 is disposed behind the upper hood 28 in the direction of travel AR, in particular behind a part of the upper hood 28 enclosing the saw blade 31. A part of the upper hood 28 enclosing the saw blade 31 thus ends in front of illumination arrangement 40 in the direction of travel AR. Thus, the illumination device 40 is particularly well protected against contamination.

Figure 8:
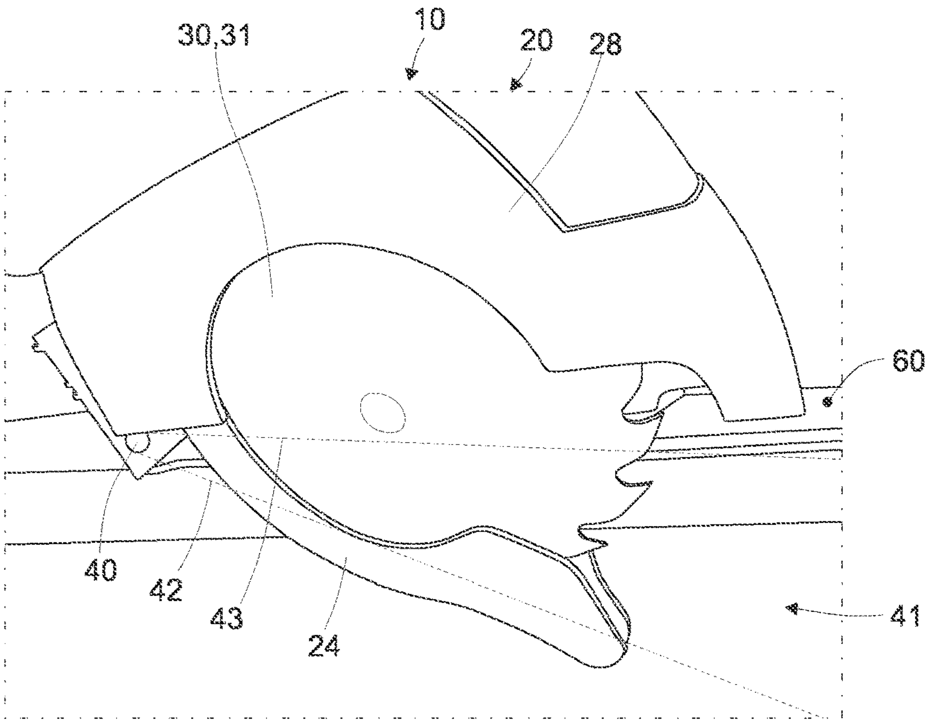
FIG. 8 shows a reduced scale representation of the power tool of FIG. 7, mounted on a guide rail.

FIGS. 7 and 8 further illustrate that the illumination arrangement 40 is positioned beneath the upper hood 28, particularly when the saw blade 31 is locked in the cutting position with maximum cutting depth. Thus, the light cone 41 emitted by the illumination arrangement 40 is passed under the lower boundary of the upper hood 28 in the direction of travel AR. In other words, the lighting assembly 40 is connected to the swiveling portion of the drive assembly 20 such that the illumination arrangement 40 can swivel about the miter bearing 26 in conjunction with the drive assembly 20. Preferably, the saw blade 31 and/or the upper hood 28 can be adjusted relative to the illumination arrangement 40, for instance about a plunge bearing axis, if present.

Figure 9:
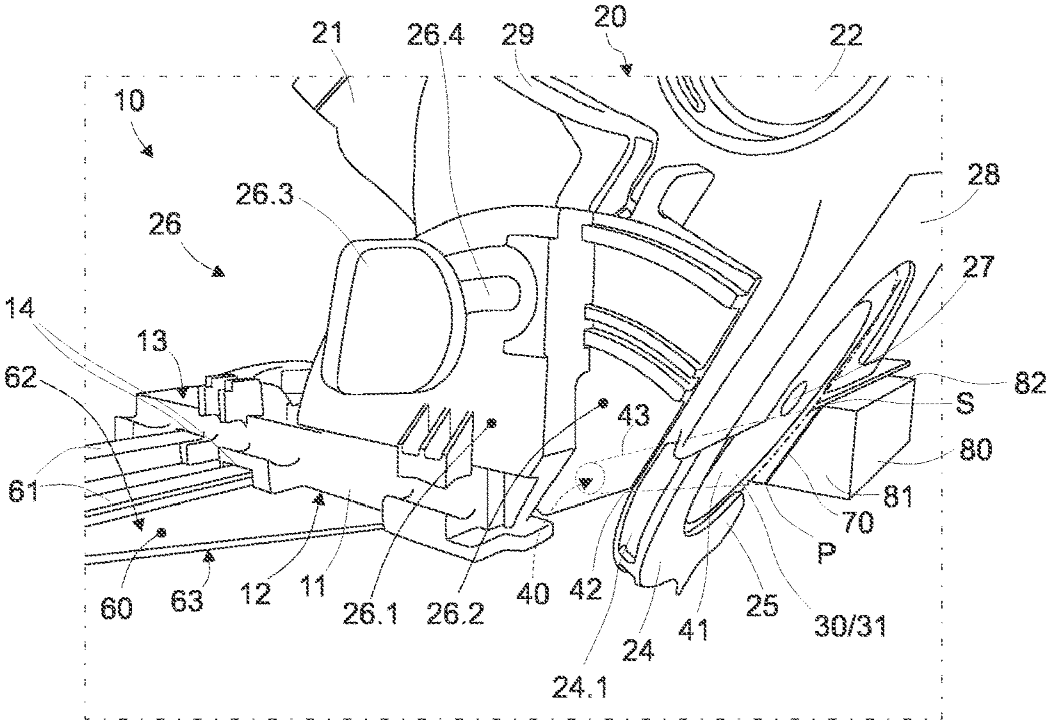
FIG. 9 shows a detailed perspective rear oblique representation of the power tool according to the invention of FIG. 8.

FIG. 9 illustrates that to adjust the locked cutting position, in particular a swivel position, the bearing piece 26.1 can be used to clamp the swivel piece 26.2. An arrester 26.3 is used for this purpose, which is guided, for instance in the form of a screw, through a slot 26.4 in the bearing piece 26.1. This screw can be screwed into a threaded mount of the swivel piece 26.2. As soon as the desired cutting position is set, the arrester 26.3 can be turned and the swivel position can be secured.

To adjust the locked cutting position, in particular the cutting depth, the locking device 29 can be used to position and lock the saw blade 31 relative to the guide plate 11.

FIG. 7 further illustrates that the light or light cone 41 of the illumination arrangement 40 is directed through the protective cover 24. FIG. 9 illustrates that, for this purpose, the protective cover 24 has an aperture 24.1, which opens the light path such that the light cone 41 can be passed at least partially along one or both sides of the saw blade 31 to create the cast shadow 70 on the end face 81 of the workpiece 80.

FIG. 8 illustrates that the aperture 24.1 in the protective cover 24 extends in the circumferential direction of the saw blade 31 at least to the extent that, when the protective cover 24 is open or partially open, the light cone 41 can be guided through the protective cover 24.

FIGS. 8 and 9 show types of application of the power tool 10 according to FIGS. 1-7. As these representations illustrate, the power tool 10 may be used in combination with a guide rail 60. The guide rail 60 is used to make a cut in the workpiece 80 that is guided in a straight line, in the direction of travel AR.

The guide rail 60 has an upper support surface 62 facing the bearing surface 12, on which the bearing surface 12 is placed. The bearing surface 12 is provided with guide mounts 14 that interact with guides 61 of the guide rail 60 to form a longitudinal guide. The longitudinal guide extends in the direction of travel AR.

In this exemplary embodiment, the guides 61 are designed as upward projecting ribs, which engage with the guide mounts 14 designed as grooves. The bottom surface 63 of the guide rail 60 may be placed on the top face 82 of the workpiece 80 and may be secured in that position when the cast shadow 70 is oriented in the desired position with respect to the workpiece 80.

Figure 10:
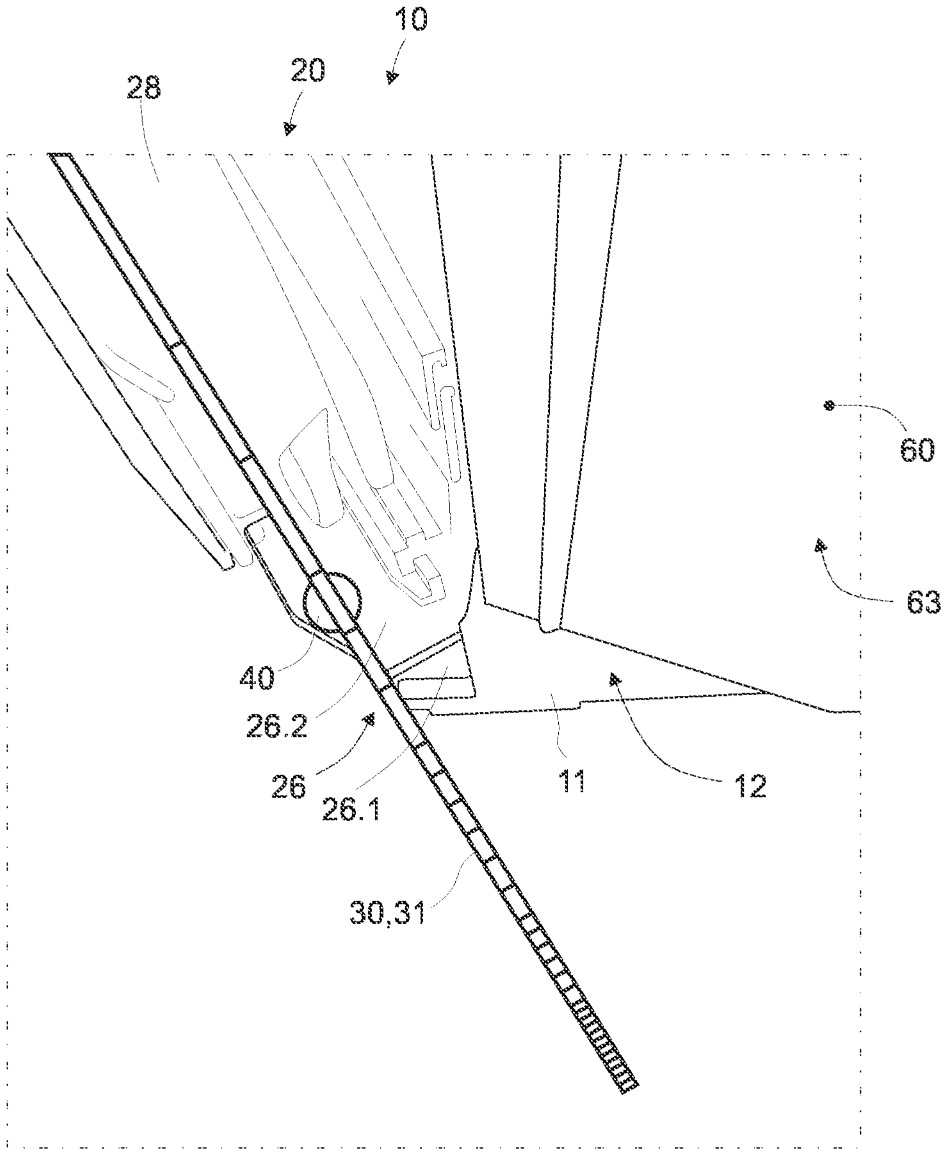
FIG. 10 shows an oblique bottom view of the power tool of FIGS. 8 and 9 facing away from the direction of travel, and, FIG. 11 shows a side view of an alternative embodiment of a power tool in the form of a hand-held jig saw

FIG. 10 shows a view of the power tool 10 according to FIGS. 8 and 9 as seen from obliquely beneath in the opposite direction to the direction of travel AR and when the protective cover 24 is open. As this representation illustrates, the illumination arrangement 40 is attached to the swivel piece 26.2 of the miter bearing 26. The illumination arrangement 40 is configured and disposed such that the light from the illumination arrangement 40 splits at the saw blade 31 to generate the two light cones 41 and 41 extending along either side of the saw blade 31.

This representation also illustrates that the arrangement of the illumination arrangement 40 is advantageously solved in such a way that only the saw blade 31 is located in the light path of the light cone 41, to be able to project the cast shadow 70 onto the workpiece 80, in particular onto the end face 81 of the workpiece 80, without being affected by other components of the power tool 10.

FIG. 10 also illustrates that the illumination arrangement 40 is advantageously disposed to be centered behind the saw blade 31.

Figure 11:
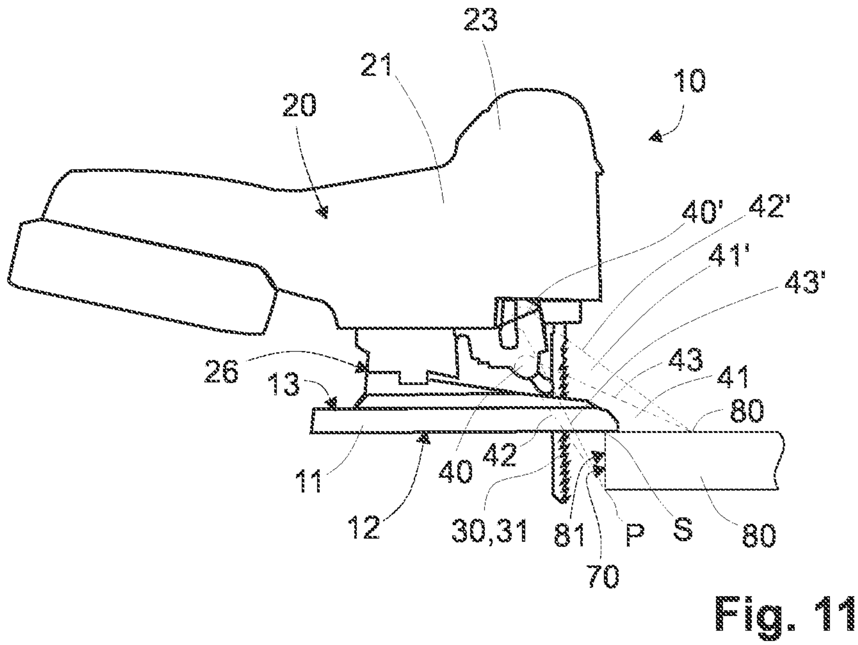

FIG. 11 shows another exemplary embodiment of a hand-held power tool 10, namely a jig saw. This power tool 10 again has a drive assembly 20 having a drive motor 21. The drive assembly 20 is swivel connected to a guide plate 11 via a miter bearing 26, wherein the drive assembly 20 is located in the area above the top face 13 of the guide plate 11. In the locked cutting position shown in FIG. 11, the cutting tool 30, namely the saw blade 31, protrudes beyond the underside 12 of the guide plate 11 at maximum cutting depth.

In the area of the drive assembly 20, similar to the above-described exemplary embodiments, an illumination arrangement 40 is disposed to emit light such that the light generates a cone of light 41 to one or both sides of the saw blade 31 to generate a cast shadow 70 on the end face 81 of a workpiece 80. Similar to the previous exemplary embodiments, for this purpose, the guide plate 11 has an aperture through which the light cone(s) 41 can be passed to be able to project the cast shadow 70 of the saw blade 31 onto the workpiece 80.

Figure 12:
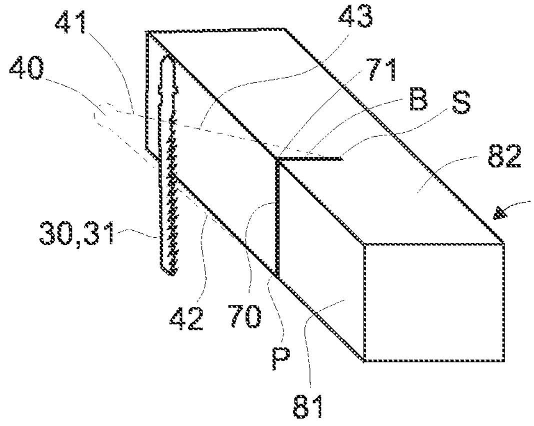
FIGS. 12 and 13 show isolated detailed representations of the power tool of FIG. 11 in various working situations.

FIG. 12 illustrates the projection of the cast shadow more clearly. Only the saw blade 31 of the power tool 10 is shown. As this representation illustrates, the light cone 41 of the illumination arrangement 40 extends such that the cast shadow 70 is projected on the end face 81 and, simultaneously, the cutting path shadow 71 of the saw blade 31 is projected on the top face 82 of the workpiece 80.

Figure 13:
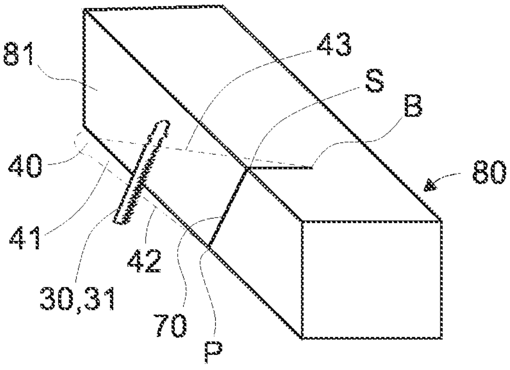

FIG. 13 illustrates a working situation in which the drive assembly 20 has been swiveled about the swivel axis of the miter bearing 26 relative to the guide plate 11 to enable a miter cut to be made in the workpiece 80. As this representation illustrates, a cast shadow 70 and/or a cutting path shadow 71 may also be projected onto the workpiece 80 in this position.

FIG. 11 also shows an additional or alternative positioning of the illumination arrangement 40. There, the illumination arrangement 40' is positioned a bit higher than the illumination arrangement 40 to achieve the desired shadow cast.

The invention claimed is:

1. A hand-held power tool, comprising:

a guide plate including a bearing surface for indirect or direct support on a workpiece to be cut, the guide plate further including a top face;

a drive assembly including a drive motor supported above the top face of the guide plate;

a cutting tool configured to be driven by the drive motor;

an illumination arrangement configured to emit a light cone onto the cutting tool in a direction of travel of the power tool;

a rear miter bearing providing a swivel connection of the drive assembly to the guide plate, the miter bearing including a bearing piece and a swivel piece swivel connected to the bearing piece, wherein the bearing piece is coupled to the guide plate and the swivel piece is coupled to the drive assembly, and wherein the illumination arrangement is fastened directly to the swivel piece; and wherein when the cutting tool is in a cutting position in which the cutting tool projects beyond the bearing surface, the cutting tool is disposed in a light path of the light cone to generate a cast shadow of the cutting tool on an end face of the workpiece to be cut, which an end face faces the cutting tool and is oriented transversely to the bearing surface of the guide plate; and wherein the light cone extends in the direction of travel across both sides of the cutting tool in the cutting position.

2. The hand-held power tool of claim 1, wherein:

the cutting tool in the cutting position is guided through a support plane formed by the bearing surface, wherein a front cutting edge of the cutting tool in the direction of travel intersects the support plane at a cutting site, and a straight line of sight is formed between the cutting site and the illumination arrangement in the locked cutting position.

3. The hand-held power tool of claim 2, wherein:

the straight line of sight extends across one or both sides of the cutting tool in the direction of travel.

4. The hand-held power tool of claim 1, wherein:

the guide plate includes an aperture through which at least part of the light cone is guided from the top face to the bearing surface of the guide plate, such that the cast shadow of the cutting tool in the cutting position is guided up to a top shadow point at most 20% of a maximum cutting depth of the cutting tool below the bearing surface.

5. The hand-held power tool of claim 4, wherein:

the top shadow point is at most 10% of the maximum cutting depth of the cutting tool below the bearing surface.

6. The hand-held power tool of claim 4, wherein:
the shadow reaches upward at least to the bearing surface.
7. The hand-held power tool of claim 1, wherein:
the cutting tool in the cutting position is disposed in the light path of the light cone so as to project a cutting path shadow of the cutting tool extending in the direction of travel onto a top face of the workpiece.
8. The hand-held power tool of claim 1, further comprising:
a further illumination arrangement disposed above the top face of the guide plate and configured to project a cutting path shadow of the cutting tool extending in the direction of travel onto a top face of the workpiece.
9. The hand-held power tool of claim 1, wherein:
the hand-held power tool is a hand-held circular saw;
the cutting tool is a saw blade of the hand-held circular saw, the saw blade being centrally connected to the drive assembly by a fastening element; and
in an aligned position of the power tool in which the cutting tool is in the locked cutting position and in which the bearing surface is oriented perpendicular to the end face of the workpiece, a light beam emitted by the illumination arrangement extends beneath the fastening element and hits an upper edge of the end face facing the bearing surface.
10. The hand-held power tool of claim 1, wherein:
the cutting position is a setting position at which the cutting tool protrudes to a maximum cutting depth beyond the bearing surface of the guide plate.
11. The hand-held power tool of claim 1, wherein:
the hand-held power tool is a hand-held circular saw;
the cutting tool is a saw blade of the hand-held circular saw; and
the power tool further includes a protective cover adjustable between a protective position and a release position, wherein in the protective position the protective cover at least partially covers the saw blade below the bearing surface, and wherein the protective cover includes an aperture through which the light cone of the illumination arrangement is at least partially guided when the protective cover is in the protective position.
12. A saw system including the hand-held power tool of claim 1, in combination with:
a guide rail including a support surface and at least one guide extending upward from the support surface, the guide rail including opposite from the support surface an underside configured to be supported by a top face of the workpiece;
wherein the bearing surface of the guide plate is seated on the support surface of the guide rail, and the guide plate includes at least one guide mount formed in the bearing surface, the at least one guide of the guide rail being received in the at least one guide mount to form a longitudinal guide; and
wherein the light cone is guided at least partially past or through the guide rail to generate the cast shadow on the end face of the workpiece.
13. A method of cutting a workpiece, comprising:
providing a hand-held power tool, including:
a guide plate having a bearing surface for indirect or direct support on the workpiece to be cut, the guide plate further including a top face;
a drive assembly including a drive motor supported above the top face of the guide plate;
a cutting tool driven by the drive motor;
an illumination arrangement configured to emit a light cone onto the cutting tool in a direction of travel of the power tool; and
a rear miter bearing providing a swivel connection of the drive assembly to the guide plate, the miter bearing including a bearing piece and a swivel piece swivel connected to the bearing piece, wherein the bearing piece is coupled to the guide plate and the swivel piece is coupled to the drive assembly, and wherein the illumination arrangement is fastened directly to the swivel piece; and
placing the cutting tool is in a cutting position in which the cutting tool projects beyond the bearing surface, the cutting tool being disposed in a light path of the light cone, wherein the light cone extends in the direction of travel across both sides of the cutting tool in the cutting position;
generating a cast shadow of the cutting tool on an end face of the workpiece to be cut, which end face faces the cutting tool and is oriented transversely to the bearing surface of the guide plate; and
making a separating cut in the workpiece with the cutting tool.
14. A hand-held circular saw, comprising:
a guide plate including a bearing surface for indirect or direct support on a workpiece to be cut, the guide plate further including a top face;
a drive assembly including a drive motor supported above the top face of the guide plate;
a circular saw blade configured to be driven by the drive motor so that the circular saw blade has an axis of rotation;
an illumination arrangement located behind the axis of rotation of the circular saw blade relative to a direction of travel of the circular saw and configured to emit a light cone onto the circular saw blade and projecting forward past the axis of rotation in the direction of travel of the circular saw; and
a rear miter bearing providing a swivel connection of the drive assembly to the guide plate, the miter bearing including a bearing piece and a swivel piece swivel connected to the bearing piece, wherein the bearing piece is coupled to the guide plate and the swivel piece is coupled to the drive assembly, and wherein the illumination arrangement is fastened directly to the swivel piece;
wherein when the circular saw blade is in a cutting position in which the circular saw blade projects beyond the bearing surface, the circular saw blade is disposed in a light path of the light cone to generate a cast shadow of the circular saw blade on an end face of the workpiece to be cut, which end face faces the circular saw blade and is oriented transversely to the bearing surface of the guide plate; and
wherein the light cone extends in the direction of travel across both sides of the cutting tool in the cutting position.

* * * * *